US012648625B1

(12) United States Patent
Ren

(10) Patent No.: US 12,648,625 B1
(45) Date of Patent: Jun. 9, 2026

(54) BELT MECHANISM FOR BELT TENSIONER AND BELT TENSIONER

(71) Applicant: Chaoqun Ren, Jieshou (CN)

(72) Inventor: Chaoqun Ren, Jieshou (CN)

( * ) Notice: Subject to any disclaimer, the term of this patent is extended or adjusted under 35 U.S.C. 154(b) by 0 days.

(21) Appl. No.: 19/233,054

(22) Filed: Jun. 10, 2025

(30) Foreign Application Priority Data

Jun. 5, 2025 (CN) .......................... 202521142722.0

(51) Int. Cl.
*A44B 11/06* (2006.01)
*B60P 7/08* (2006.01)

(52) U.S. Cl.
CPC ............. *A44B 11/065* (2013.01); *B60P 7/083* (2013.01); *B60P 7/0846* (2013.01); *Y10T 24/2175* (2015.01)

(58) Field of Classification Search
CPC ..... A44B 11/06; A44B 11/065; A44B 11/125; A44B 11/14; A44B 11/16; A44B 11/02; A44B 11/12; B60P 7/0823; B60P 7/083; B60P 7/06; B60P 7/0846; B65H 75/28; B65H 75/285; Y10T 24/213; Y10T 24/2113; Y10T 24/2121; Y10T 24/3936; Y10T 24/3953; Y10T 24/4072; Y10T 24/44291; Y10T 24/44385; Y10T 24/44427; Y10T 24/44444; Y10T 24/4447; Y10T 24/4462; Y10T 24/44479; Y10T 24/4453; Y10T 24/44538; Y10T 24/44641; Y10T 24/4773; Y10T 24/2175
See application file for complete search history.

(56) References Cited

U.S. PATENT DOCUMENTS

| | | | |
|---|---|---|---|
| 6,547,218 B2 * | 4/2003 | Landy ..................... | B60P 7/083 24/68 CD |
| 8,522,402 B1 * | 9/2013 | Spooler ................. | B60P 7/0846 24/68 E |
| 11,313,437 B1 * | 4/2022 | Williams ................ | B60P 7/083 |
| 2009/0178256 A1 * | 7/2009 | Toth ..................... | A44B 11/125 24/273 |
| 2015/0191114 A1 * | 7/2015 | Blankenship ........ | A44B 11/065 24/69 CT |
| 2024/0138530 A1 * | 5/2024 | Lu ......................... | A44B 11/125 |

* cited by examiner

*Primary Examiner* — Jason W San
*Assistant Examiner* — Michael S Lee
(74) *Attorney, Agent, or Firm* — JEEN IP LAW, LLC

(57) ABSTRACT

A belt mechanism for a belt tensioner and the belt tensioner are provided. The belt mechanism includes a clamping component, the clamping component includes a clamping frame, a clamping torsion spring, and a clamping body. The clamping frame is rotatably connected to a driving arm of the belt tensioner, one end of the clamping torsion spring abuts against the driving arm, and the other end thereof abuts against the clamping frame. The clamping body is fixedly provided at one end of the clamping frame; when the clamping component clamps and fixes excess webbing, the clamping body clamps and fixes the excess webbing to the belt tensioner. A fixing component includes one or two fixing rods. When the clamping torsion spring drives the clamping frame to rotate and reset towards the driving arm of the belt tensioner, the fixing rod abuts against the clamping frame to prevent it from resetting.

7 Claims, 9 Drawing Sheets

13

14

11

12

BELT MECHANISM FOR BELT TENSIONER AND BELT TENSIONER

CROSS-REFERENCE TO RELATED APPLICATIONS

This application claims priority to Chinese Patent Application No. 202521142722.0, filed on Jun. 5, 2025, which is hereby incorporated by reference in its entirety.

TECHNICAL FIELD

The present disclosure relates to the field of tensioner technologies, and in particular, to a belt mechanism for a belt tensioner and the belt tensioner.

BACKGROUND

As a commonly used tool in the fields of logistics packaging, cargo fixation, and outdoor equipment, the belt tensioner applies tension and locks the belts (such as nylon ties, steel straps, or plastic strapping) through mechanical force to ensure the stability of the goods during transportation or storage, thereby preventing loosening or displacement caused by vibration or impact.

The current belt tensioners generally include a base, a main shaft, a driving arm, and a ratchet component. The base is rotatably connected to the main shaft, and the driving arm is rotatably connected to the main shaft. The main shaft is provided with a tightening groove, and the belt can be threaded through the tightening groove. The ratchet component is set on the main shaft, which is used to tighten the belt when the driving arm rotates unidirectionally. The driving arm drives the main shaft to rotate through the ratchet component to complete the tightening of the belt and keep the main shaft from easily rotating and loosening the belt.

Regarding the relevant technologies, after fixing the goods, the excess long ends of the woven tape are not fixed and are usually knotted. However, after the tied goods are scattered, the knotted and bound long ends of the webbing are prone to loosening and drifting, which poses a high safety hazard.

SUMMARY

In order to store and fix the excess webbing, this application provides a belt mechanism for a belt tensioner and the belt tensioner.

The belt mechanism and belt tensioner provided in this application adopt the following technical solution.

A belt mechanism for a belt tensioner, including a clamping component and a fixing component; the clamping component includes a clamping frame, a clamping torsion spring, and a clamping body; the clamping frame is rotatably connected to a driving arm of the belt tensioner; one end of the clamping torsion spring abuts against the driving arm of the belt tensioner, and the other end of the clamping torsion spring abuts against the clamping frame; the clamping body is fixedly provided at one end of the clamping frame; when the clamping component clamps and fixes excess webbing, the clamping body clamps and fixes the excess webbing to the belt tensioner;

the fixing component includes one or two fixing rods, the fixing rods are slidably fitted with the driving arm of the belt tensioner; the clamping frame is rotated away from the driving arm of the belt tensioner to a first position;

when the clamping torsion spring drives the clamping frame to rotate towards the driving arm of the belt tensioner at a second position, the fixing rods abut against the clamping frame so as to prevent the clamping frame from resetting.

By adopting the above technical solution, when the belt mechanism clamps and fixes the excess webbing, the clamping frame is rotated towards a direction away from the driving arm of the belt tensioner to the second position. When the clamping torsion spring drives the clamping frame to rotate and reset towards the driving arm of the belt tensioner, the fixing rod abuts against the clamping frame, so that the clamping frame cannot be reset. Then, the excess webbing is wound up with the belt tensioner, and the fixing component is unlocked, so that the clamping torsion spring drives the clamping frame to reset until the clamping body clamps and fixes the excess webbing to the belt tensioner, thus completing the clamping and fixing of the excess webbing. This improves the problem that after fixing the goods, a long head of the excess webbing is not fixed and usually requires knotting treatment. However, after tied goods are scattered, the long end of the knotted and tied webbing is prone to loosen and the knot may scattered, scattered excess webbing may poses a high safety hazard.

In some embodiments of the present disclosure, the fixing component further includes pushing blocks, the number of the pushing blocks is the same as that of the fixing rods; the pushing blocks are slidably fitted with the driving arm of the belt tensioner; the pushing blocks are fixedly connected to the fixing rods; when the pushing blocks are pressed, the pushing blocks drive the fixing rods to slide, and the fixing component is unlocked to cause the clamping frame to be reset.

In some embodiments of the present disclosure, the fixing component further includes a reset spring, and the reset spring is provided on the driving arm of the belt tensioner; the reset spring is connected to the fixing rods, and the reset spring is configured to drive the fixing rods to return, so that when the clamping torsion spring drives the clamping frame to rotate and return towards the driving arm of the belt tensioner, the fixing rods abut against the clamping frame.

In some embodiments of the present disclosure, one side of the fixing rods is provided with an inclined surface, and when the clamping frame is rotated away from the driving arm of the belt tensioner and abuts against the inclined surface, the clamping frame pushes the fixing rods to slide through the inclined surface so as to unlock the fixing component.

In some embodiments of the present disclosure, the fixing component further includes one or more limit blocks, and the limit blocks are fixedly provided on the driving arm of the belt tensioner; when the reset spring pushes the fixing rods to reset, the pushing block abuts against the limit blocks.

In some embodiments of the present disclosure, the pushing block is engraved with a friction texture to cause the pushing block to be easily pushed.

In some embodiments of the present disclosure, the clamping body is fixedly provided with a plurality of fixing protrusions on one side facing the belt tensioner, and when the clamping body clamps and fixes the excess webbing to the belt tensioner, each of the fixing protrusions abuts against the webbing.

A belt tensioner, including a base, a main shaft, a driving arm, and a ratchet assembly; where the base is rotatably connected to the main shaft, and the driving arm is rotatably connected to the main shaft; the main shaft is provided with a tightening groove; the ratchet assembly includes a driving ratchet, a limit pawl, a limit spring, a driving pawl, and a driving spring; the driving ratchet is coaxially provided on the main shaft; the limit pawl is slidably fitted with the base, and the limit pawl is engaged with the driving ratchet; one end of the limit spring is connected to the limit pawl, the other end of the limit spring is connected to the base; the driving pawl is slidably fitted with the driving arm, and the driving pawl is engaged with the driving ratchet; one end of the driving spring is connected to the driving pawl, and the other end of the driving spring is connected to the driving arm; when the driving arm is rotated away from the base, the driving pawl drives the driving ratchet to rotate.

In summary, this application includes at least one beneficial technical effect as follows.

When the belt mechanism clamps and fixes the excess webbing, the clamping frame is rotated away from the driving arm of the belt tensioner to the first position. When the clamping torsion spring drives the clamping frame to rotate and reset towards the driving arm of the belt tensioner, the fixing rods abut against the clamping frame to prevent it from resetting. Then, the excess webbing is wound up with the belt tensioner, and the fixing component is unlocked, so that the clamping torsion spring drives the clamping frame to reset until the clamping body clamps and fixes the excess webbing to the belt tensioner, thereby completing the clamping and fixing of the excess webbing. This improves the situation where the long head of the excess webbing is not fixed after fixing the goods and usually requires knotting treatment. However, for tied goods, after unraveling, the long end of the knotted and tied webbing is prone to loosen, and the knot may scatter. The scattered webbing may pose a high safety hazard.

Figure 1:
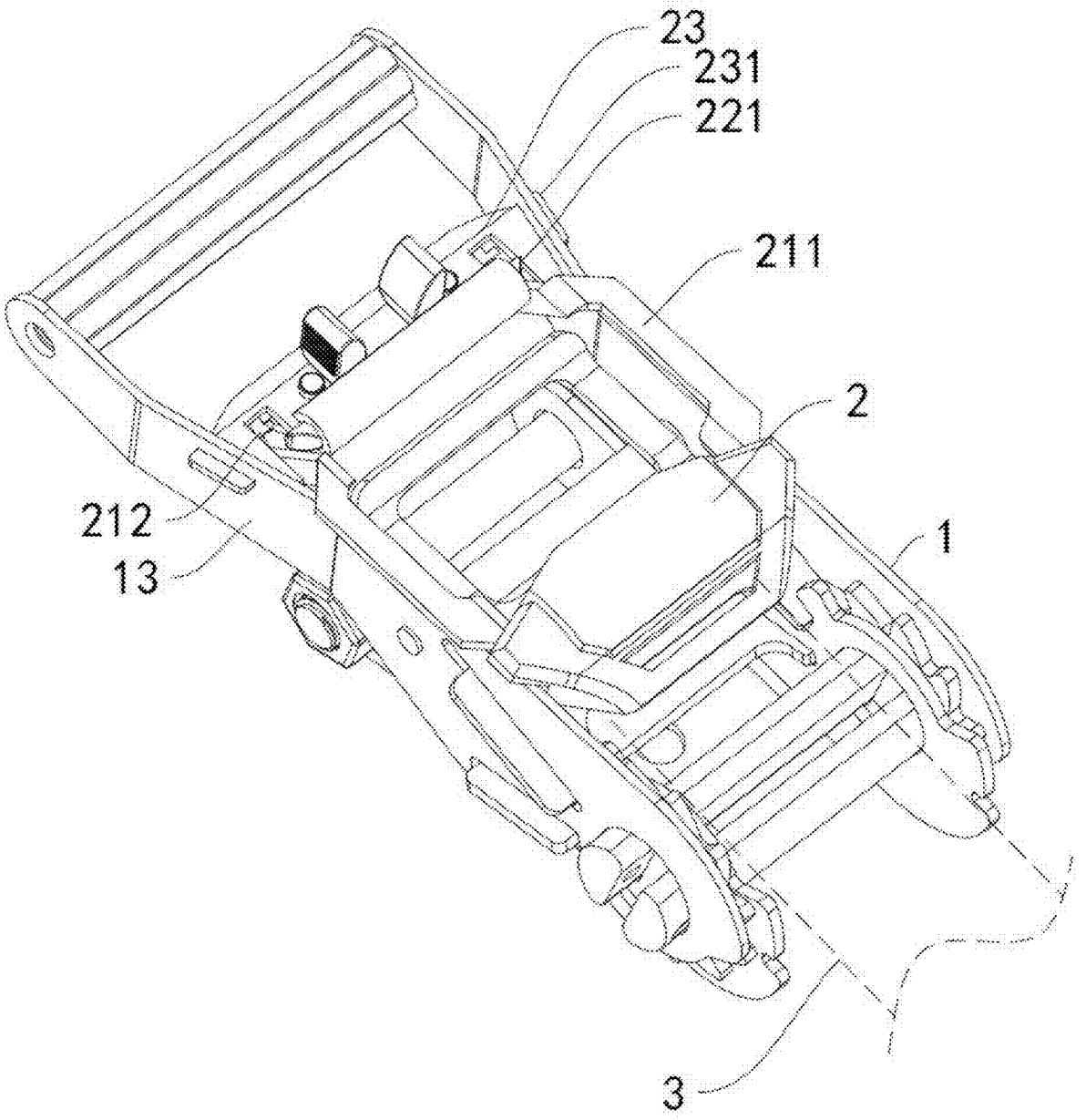
FIG. 1 is a schematic structural diagram of an application of a belt mechanism for a belt tensioner of an embodiment.
Figure 2:
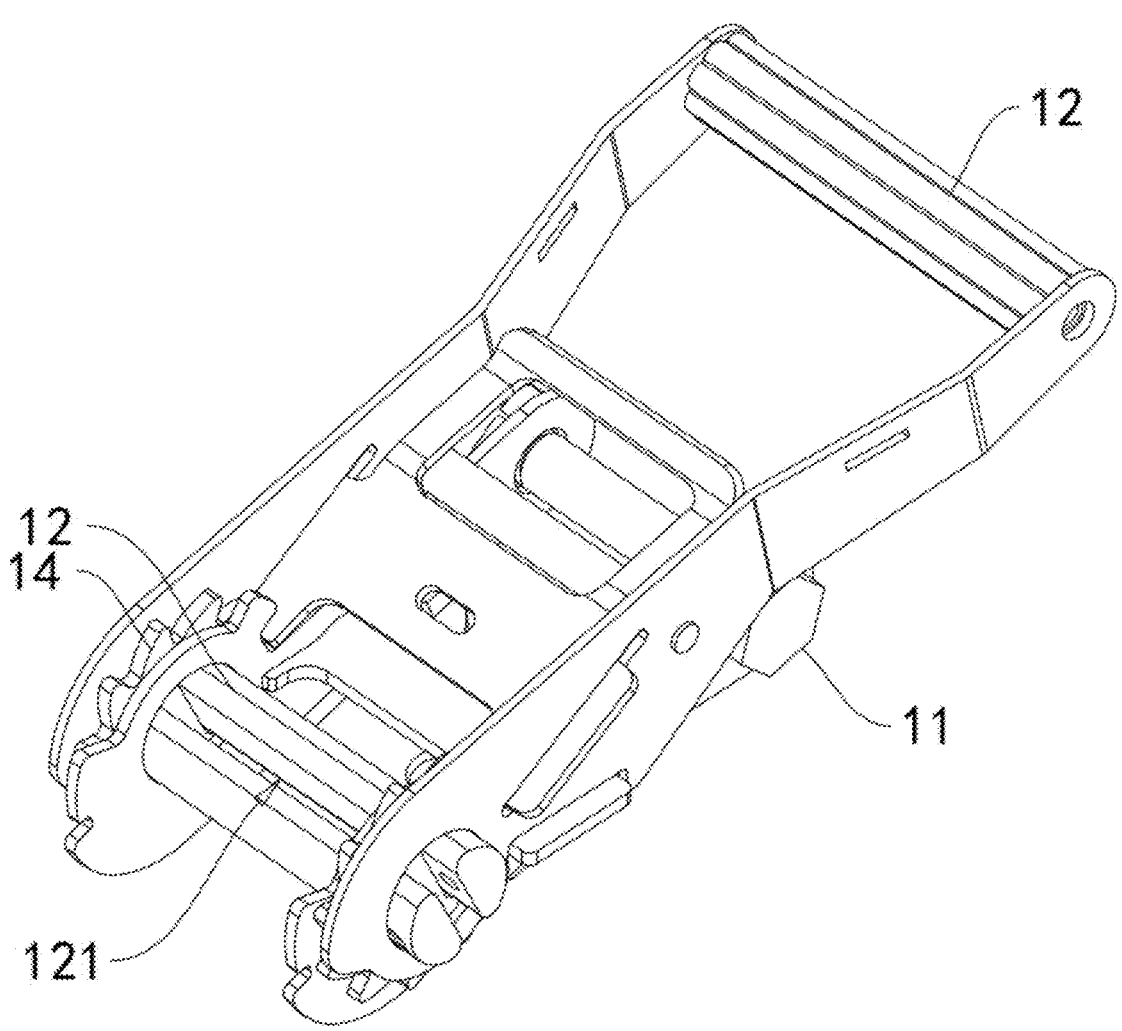
FIG. 2 is a first schematic diagram of an overall structure of the belt tensioner in an embodiment of the present application.
Figure 3:
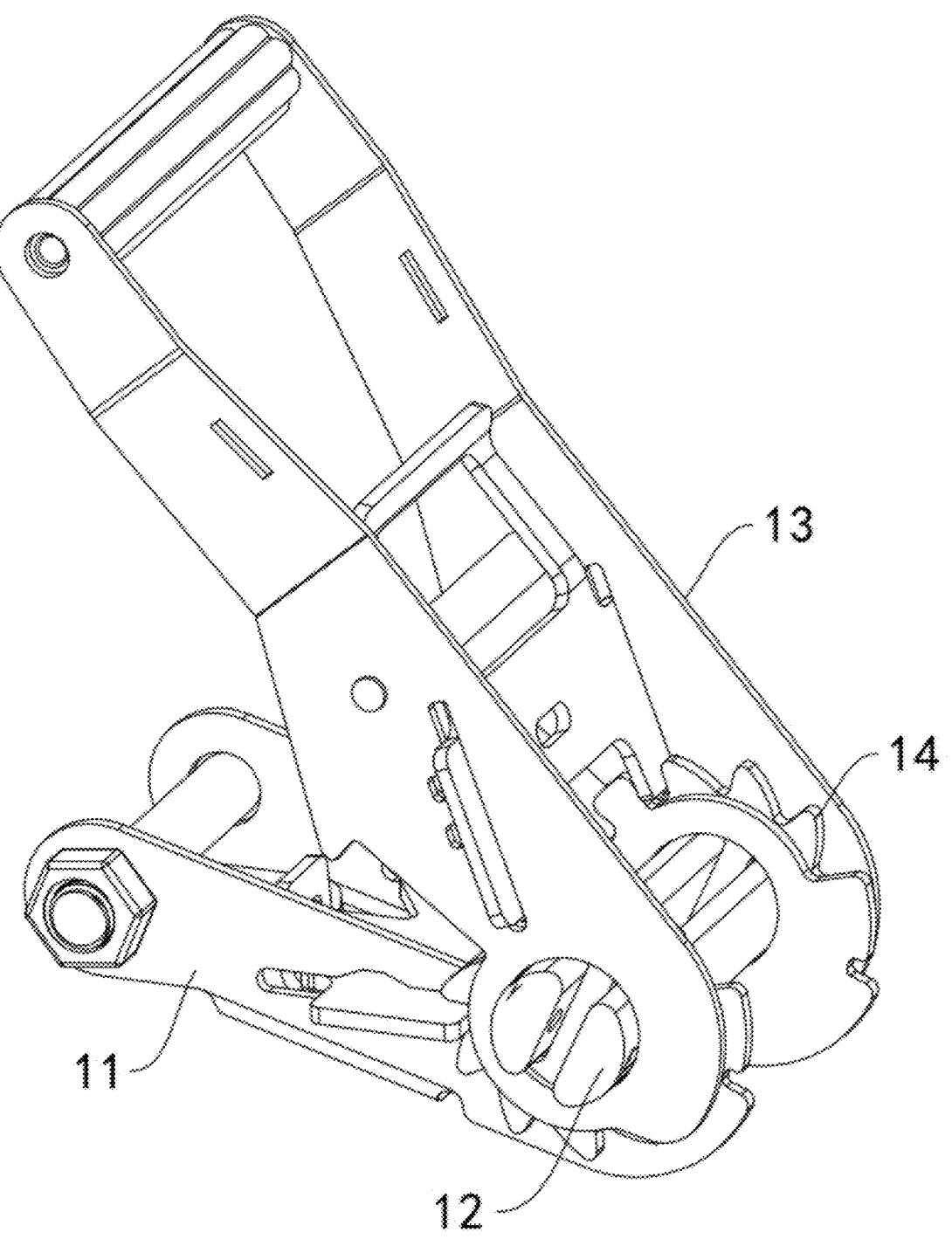
FIG. 3 is an unfolded view of the overall structure of the belt tensioner in an embodiment of the present application.
Figure 4:
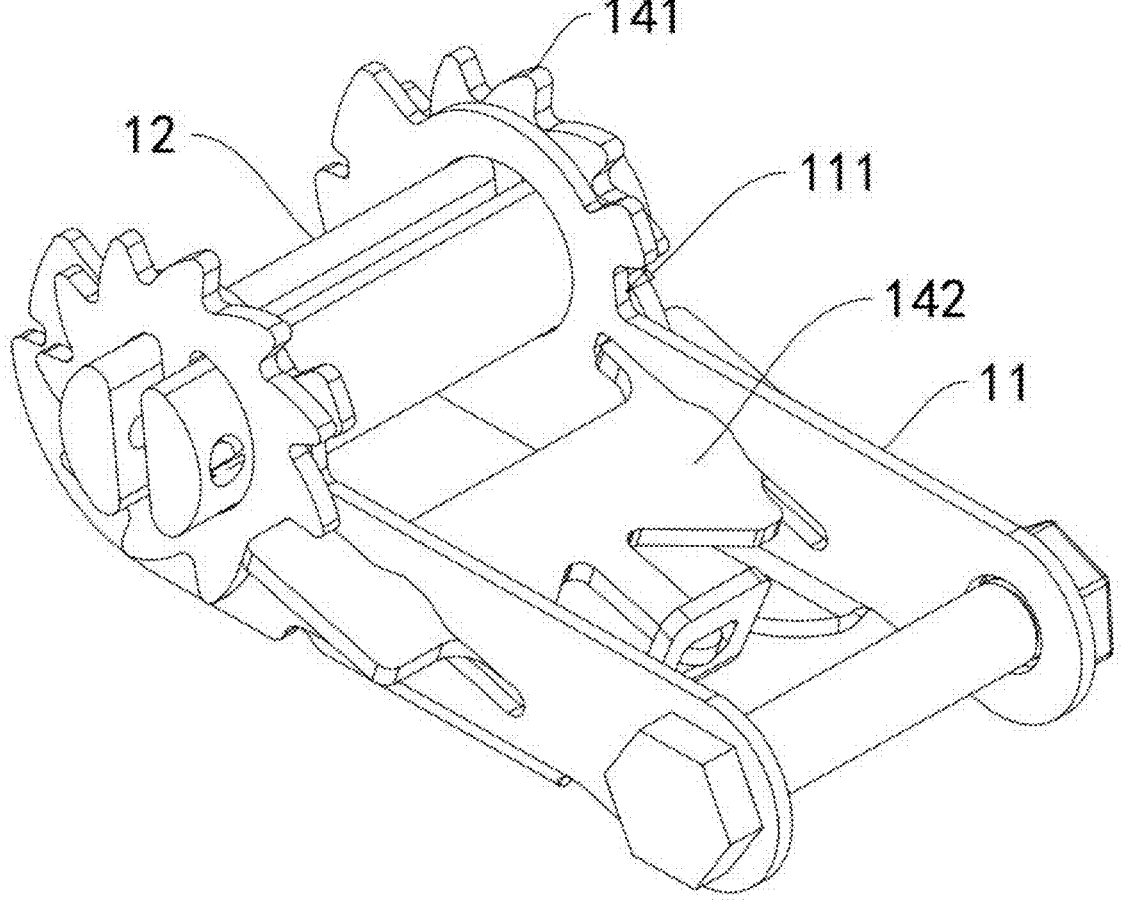
FIG. 4 is a schematic structural diagram of a base in an embodiment of the present application.
Figure 5:
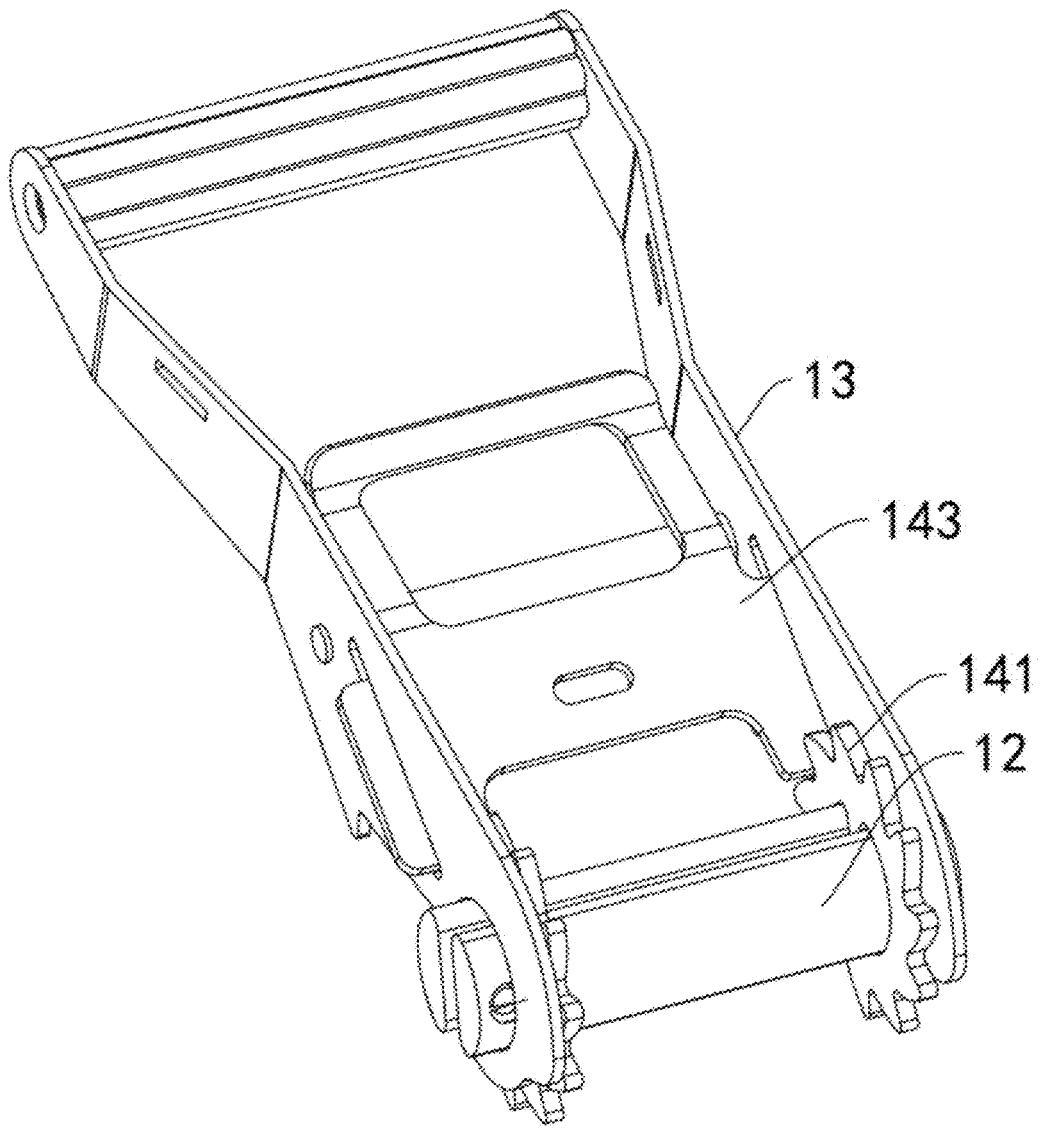
FIG. 5 is a schematic structural diagram of a driving arm in an embodiment of the present application.

Numeral references: 11—base; 111—clamping slot; 12—main shaft; 121—tightening groove; 13—driving arm; 14—ratchet assembly; 141—driving ratchet; 142—limit pawl; 143—driving pawl; 21—clamping component; 211—clamping frame; 212—clamping torsion spring; 213—clamping body; 2131—fixing protrusion; 22—fixing component; 221—fixing rod; 2211—inclined surface; 222—pushing block; 2221—friction texture; 223—reset spring;

224—limit block; 1—belt tensioner; 2—belt mechanism; 23—bridging piece; 231—bridging tab; 3—webbing.

DESCRIPTION OF EMBODIMENTS

Further detailed explanation of the present application will be provided in combination with FIGS. 1-9.

An embodiment discloses a belt mechanism for a belt tensioner and the belt tensioner. Referring to FIGS. 1, 2, 3, 4, and 5, the belt tensioner includes a base 11, a main shaft 12, a driving arm 13, and a ratchet assembly 14. The base 11 is rotatably connected to the main shaft 12, and the driving arm 13 is rotatably connected to the main shaft 12. The main shaft 12 is provided with a tightening groove 121, and the base 11 is provided with a clamping slot 111. The ratchet assembly 14 includes two driving ratchets 141, a limit pawl 142, a limit spring, a driving pawl 143, and a driving spring. The two driving ratchets 141 are coaxially provided at two ends of the main shaft 12, and the limit pawl 142 is slidably fitted to the base 11. The limit pawl 142 is engaged with the driving ratchets 141, and one end of the limit spring is connected to the limit pawl 142 (not shown in the figure), and the other end thereof is connected to the base 11. The driving pawl 143 is slidably fitted with the driving arm 13. The driving pawl 143 is engaged with the driving ratchets 141. One end of the driving spring is connected to the driving pawl 143 (not shown in the figure), and the other end of the driving spring is connected to the driving arm 13. When the driving arm 13 is adhered to the base 11 and does not need to rotate, the driving pawl 143 is inserted and clamped into the clamping slot 111, rendering it difficult for the driving arm 13 to separate from the base 11.

The implementation principle of the belt tensioner in this application is as follows: when a webbing 3 needs to be tightened, the webbing 3 passes through the tightening groove 121, the driving pawl 143 is pulled to make the driving pawl slide away from the clamping slot 111 and disengage from a clamping cooperation with the clamping slot 111, the driving arm 13 is rotated away from the base 11 to a first position, the driving spring drives the driving pawl 143 to reset, the driving arm 13 is rotated away from the base 11, the driving pawl 143 drives the two driving ratchets 141 to rotate, the two driving ratchets 141 drive the main shaft 12 to rotate, and then the driving arm 13 is rotated towards the base 11 to a second position, thereby achieving a tightening of the webbing 3. The driving arm 13 reciprocates in this way until the webbing 3 is tightened to a required degree. The driving arm 13 is rotated towards the base 11 until it is adhered to the base 11, subsequently, the driving pawl 143 is inserted and clamped with the clamping slot 111, so that the belt tensioner 1 completes the tightening of the webbing 3. When the webbing 3 needs to be loosened, the limit pawl 142 is pulled and is disengaged from the driving ratchets 141, the webbing 3 is pulled to complete a relaxation of the webbing 3.

Figure 6:
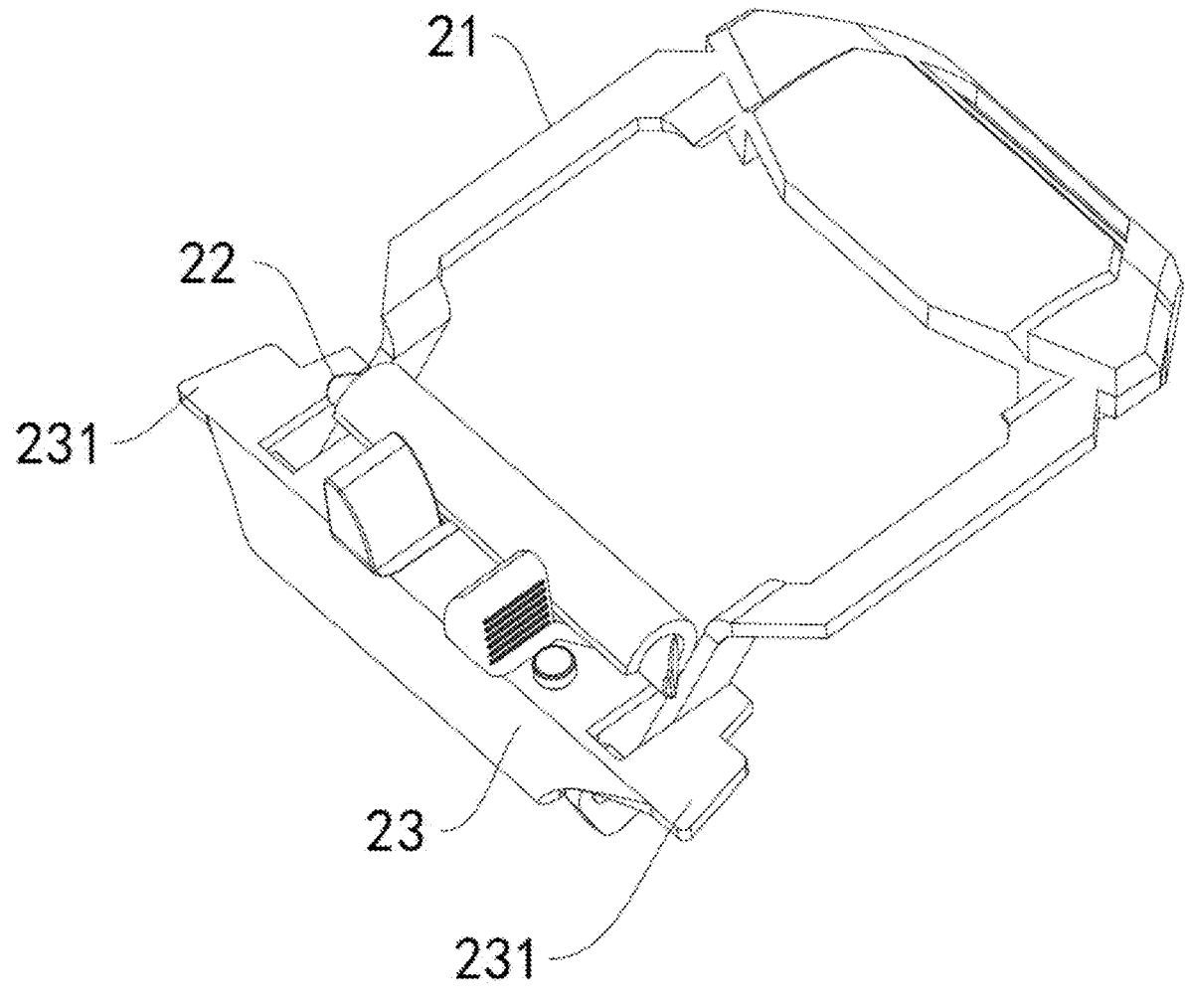
FIG. 6 is a second schematic diagram of the overall structure of the belt mechanism in an embodiment of the present application.
Figure 9:
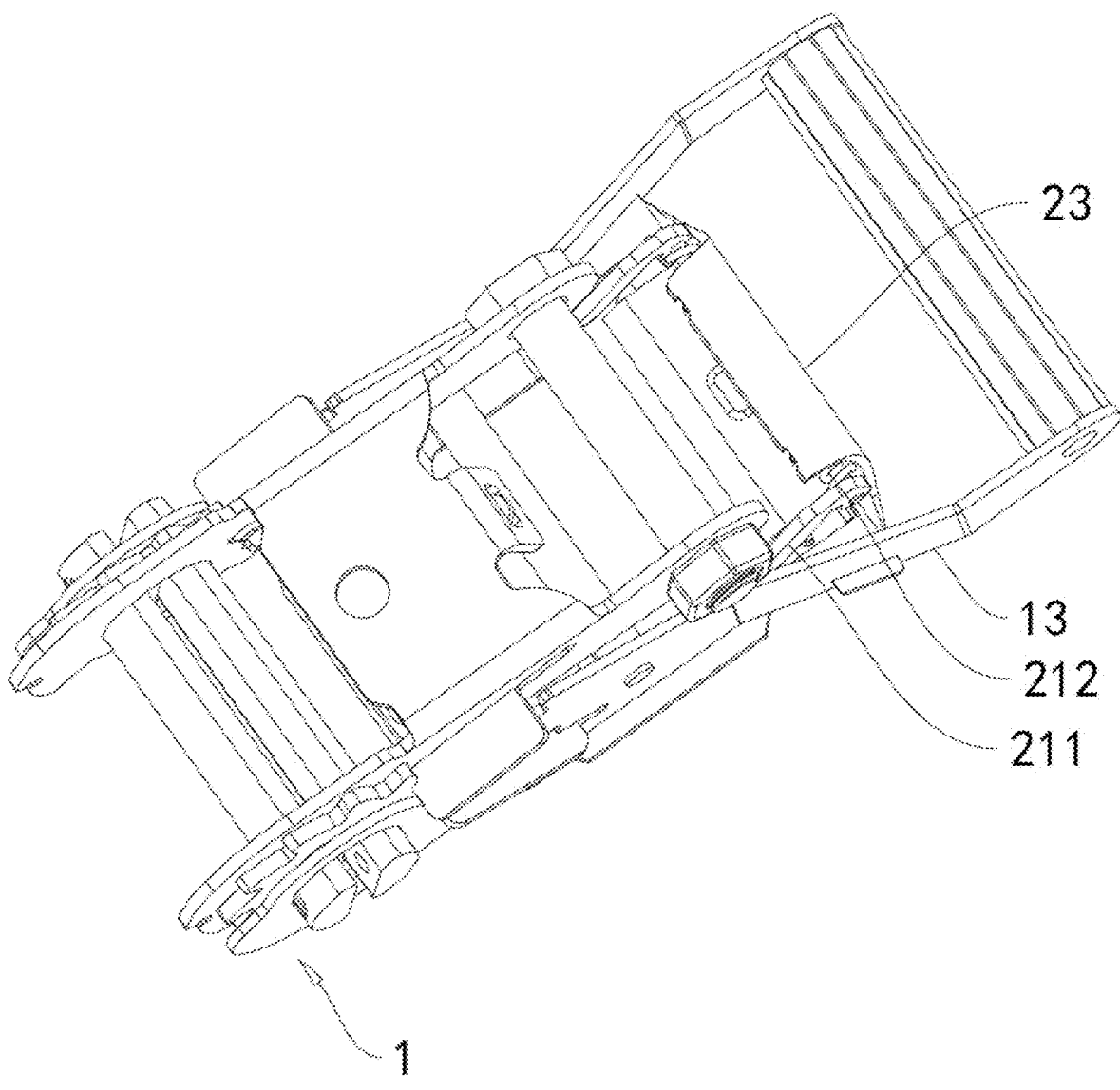
FIG. 9 is a second schematic structural diagram of the fixing component in an embodiment of the present application.

Referring to FIGS. 1 and 6, a belt mechanism for a belt tensioner includes a clamping component 21 and a fixing component 22; the clamping component 21 and the fixing component 22 are both provided on a driving arm 13 of a belt tensioner 1. A bridging piece 23 is inserted into the clamping slot 111. The bridging piece 23 is provided on the driving arm 13, and the bridging piece 23 is used to install the clamping component 21 and the fixing component 22. The bridging piece 23 is fixedly provided with bridging tabs 231 at both ends, and is fixedly connected to the driving arm 13 through the bridging tabs 231 (as shown in FIGS. 1, 7 and 9).

Figure 7:
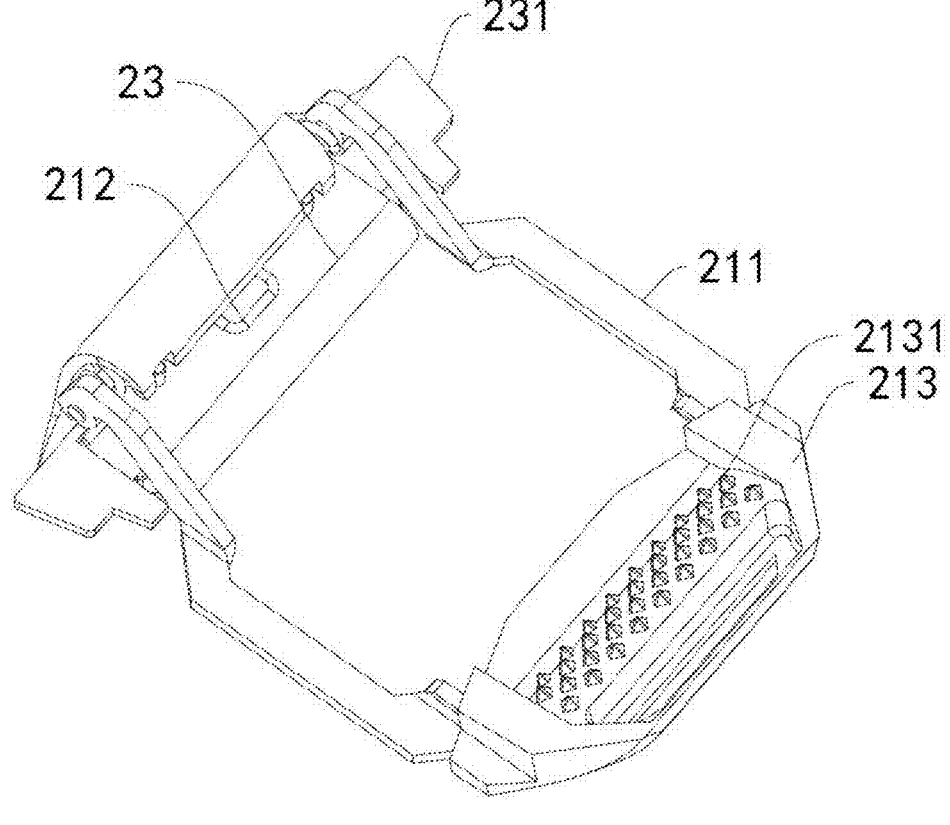
FIG. 7 is a schematic structural diagram of a clamping component in an embodiment of the present application.

Referring to FIG. 7, the clamping component 21 includes a clamping frame 211, a clamping torsion spring 212, and a clamping body 213. The clamping frame 211 is rotatably connected to the driving arm 13 of the belt tensioner 1, and the clamping torsion spring 212 is located between the clamping frame 211 and the driving arm 13 of the belt tensioner 1. One end of the clamping torsion spring 212 abuts against the driving arm 13 of the belt tensioner 1, and the other end of the clamping torsion spring 212 abuts against the clamping frame 211. The clamping body 213 is fixedly provided at one end of the clamping frame 211. When the clamping component 21 clamps and fixes excess webbing 3, the clamping body 213 clamps and fixes the excess webbing 3 to the driving pawl 143 of the belt tensioner 1. One side of the clamping body 213 facing the driving pawl 143 of the belt tensioner 1 is provided with a plurality of fixing protrusions 2131. When the clamping body 213 clamps and fixes the excess webbing 3 to the belt tensioner 1, each fixing protrusion 2131 abuts against the webbing 3. Thus, the clamping body 213 has better stability in clamping and fixing the webbing 3. The clamping torsion spring 212 abuts against the bridging piece 23.

Figure 8:
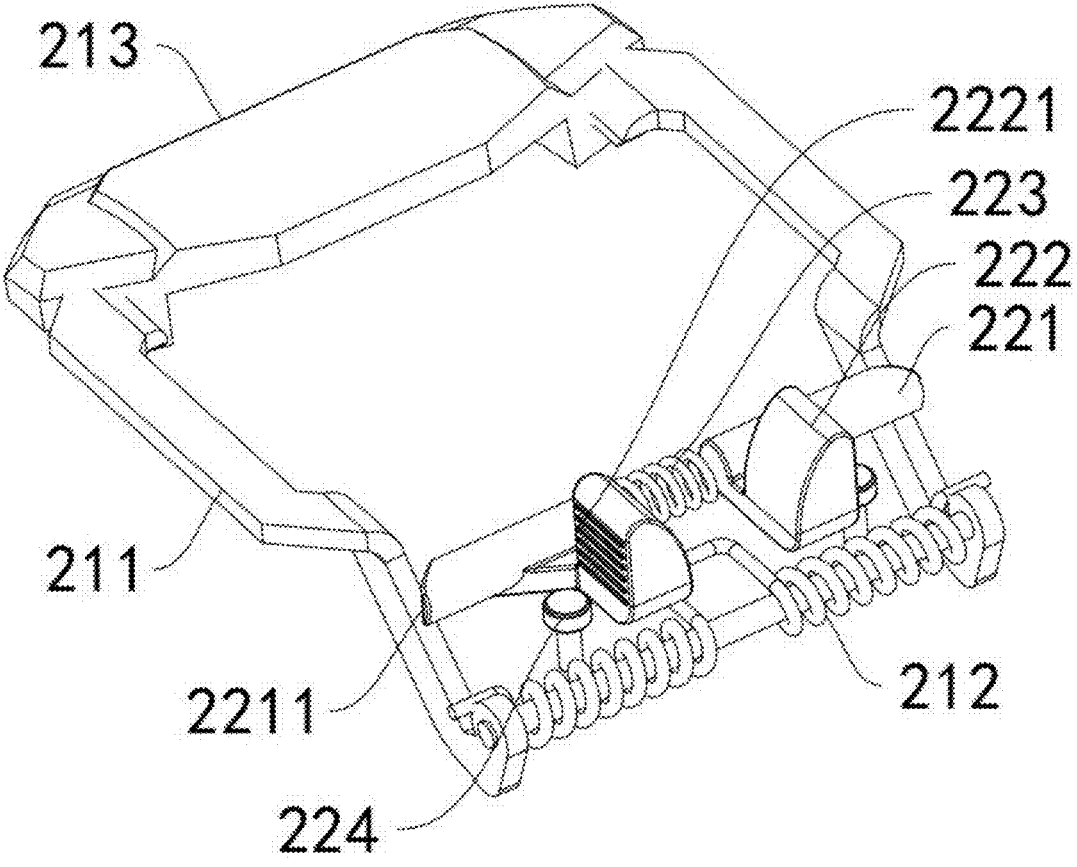
FIG. 8 is a first schematic structural diagram of a fixing component in an embodiment of the present application.

Referring to FIG. 8, the fixing component 22 includes two fixing rods 221, two pushing blocks 222, and a reset spring 223. The two fixing rods 221 are both slidably fitted to the driving arm 13 of the belt tensioner 1. The two fixing rods 221 can slide in a direction of approaching or moving away from each other. When the two fixing rods 221 slide in the direction of moving away from each other, the two fixing rods 221 slide in a direction of approaching two sides of the clamping frame 211. The two pushing blocks 222 are slidably fitted to the driving arm 13 of the belt tensioner 1, and the two pushing blocks 222 are fixedly connected to the two fixing rods 221. The reset spring 223 is located between the two fixing rods 221, and two ends of the reset spring 223 are connected to the two fixing rods 221. One side of each of the two fixing rods 221 is provided with an inclined surface 2211.

Referring to FIG. 8, the fixing component 22 further includes two limit blocks 224, and the two limit blocks 224 are fixedly provided on the driving arm 13 of the belt tensioner. When the reset spring 223 pushes the fixing rod 221 to reset, the pushing blocks 222 abut against the limit blocks 224; the pushing blocks 222 are engraved with a friction texture 2221 to render the pushing blocks 222 are easy to press.

The implementation principle of the belt mechanism for a belt tensioner in this application is as follows: when the belt mechanism 2 clamps and fixes the excess webbing 3, the clamping frame 211 is rotated away from the driving arm 13 of the belt tensioner 1 until two sides of the clamping frame 211 are respectively abutted against the two inclined surfaces 2211. The clamping frame 211 then pushes the two fixing rods 221 to slide towards each other, unlocking the fixing component 22 and completing the unfolding of the clamping frame 211. Then, the reset spring 223 pushes the two fixing rods 221 to slide away from each other, so that the fixing component 22 is locked again. When the clamping torsion spring 212 drives the clamping frame 211 to rotate and reset towards the driving arm 13 of the belt tensioner 1, the two fixing rods 221 are both abutted against the fixing component 22, so that the clamping frame 211 cannot complete the reset. Thus, it is convenient for a user to roll up the excess webbing 3 at the driving pawl 143 of the belt tensioner 1. After the user completes the winding of the excess webbing 3, he simultaneously presses the two pushing blocks 222, and the two pushing blocks 222 drive the two fixing rods 221 to slide towards each other, thereby unlocking the fixing component 22 and resetting the clamping frame 211. The clamping body 213 achieves the clamping and fixing of the excess webbing 3, improving the problem that after fixing the goods, the long end of the excess webbing 3 is not fixed and usually needs to be knotted. However, after the tied goods are scattered, the knotted and bound webbing 3 long end is easy to loosen the knot and scatter, which poses a high safety hazard.

The above are the preferred embodiments of the present application and do not limit the protection scope of the present application. Therefore, any equivalent changes made according to the structure, shape, and principle of the present application should be included in the protection scope of the present application.

What is claimed is:

1. A belt mechanism for a belt tensioner, comprising a clamping component and a fixing component;
    the clamping component comprises a clamping frame, a clamping torsion spring, and a clamping body;
    the clamping frame is rotatably connected to a driving arm of the belt tensioner;
    one end of the clamping torsion spring abuts against the clamping frame;
    the clamping body is fixedly provided at one end of the clamping frame;
    when the clamping component clamps and fixes excess webbing, the clamping body clamps and fixes the excess webbing to the belt tensioner;
    the fixing component comprises two fixing rods, the fixing rods are slidably fitted with the driving arm of the belt tensioner;
    the clamping frame is rotated away from the driving arm of the belt tensioner to a first position;
    when the clamping torsion spring drives the clamping frame to rotate towards the driving arm of the belt tensioner, and the clamping frame is at a second position, the fixing rods abut against the clamping frame so as to prevent the clamping frame from resetting.

2. The belt mechanism for a belt tensioner according to claim 1, wherein the fixing component further comprises pushing blocks, the number of the pushing blocks is the same as that of the fixing rods;
    the pushing blocks are slidably fitted with the driving arm of the belt tensioner;
    the pushing blocks are fixedly connected to the fixing rods;
    when the pushing blocks are pressed, the pushing blocks drive the fixing rods to slide, and the fixing component is unlocked to cause the clamping frame to be reset.

3. The belt mechanism for a belt tensioner according to claim 2, wherein the fixing component further comprises a reset spring, and the reset spring is provided on the driving arm of the belt tensioner;
    the reset spring is connected to the fixing rods, when the clamping torsion spring drives the clamping frame to rotate and return towards the driving arm of the belt tensioner, the fixing rods abut against the clamping frame.

4. The belt mechanism for a belt tensioner according to claim 3, wherein one side of the fixing rods is provided with an inclined surface, and when the clamping frame is rotated away from the driving arm of the belt tensioner and abuts against the inclined surface, the clamping frame pushes the fixing rods to slide via the inclined surface so as to unlock the fixing component.

5. The belt mechanism for a belt tensioner according to claim 3, wherein the fixing component further comprises one or more limit blocks, and the limit blocks are fixedly provided on the driving arm of the belt tensioner;

when the reset spring pushes the fixing rods to reset, the pushing block abuts against the limit blocks.

6. The belt mechanism for a belt tensioner according to claim 2, wherein the pushing block is engraved with a friction texture to cause the pushing block to be easily pushed.

7. The belt mechanism for a belt tensioner according to claim 1, wherein the clamping body is fixedly provided with a plurality of fixing protrusions on one side facing the belt tensioner, and when the clamping body clamps and fixes the excess webbing to the belt tensioner, each of the fixing protrusions abuts against the webbing.

\* \* \* \* \*